(12) United States Patent
Luo et al.

(10) Patent No.: US 12,184,871 B2
(45) Date of Patent: Dec. 31, 2024

(54) RESIDUAL-FREE PALATTE MODE CODING

(71) Applicants: ADVANCED MICRO DEVICES, INC., Santa Clara, CA (US); ATI TECHNOLOGIES ULC, Markham (CA)

(72) Inventors: Ying Luo, Richmond Hill (CA); Alvin Duong, Markham (CA); Edward Harold, Markham (CA); Wei Gao, Markham (CA); Shu-Hsien Samuel Wu, Aurora (CA); Haibo Liu, Markham (CA); Ehsan Mirhadi, Santa Clara, CA (US)

(73) Assignees: ATI TECHNOLOGIES ULC, Markham (CA); ADVANCED MICRO DEVICES, INC., Santa Clara, CA (US)

( * ) Notice: Subject to any disclaimer, the term of this patent is extended or adjusted under 35 U.S.C. 154(b) by 104 days.

(21) Appl. No.: 18/079,624

(22) Filed: Dec. 12, 2022

(65) Prior Publication Data

US 2024/0195990 A1 Jun. 13, 2024

(51) Int. Cl.
*H04N 19/186* (2014.01)
*H04N 19/124* (2014.01)
*H04N 19/176* (2014.01)
*H04N 19/184* (2014.01)
*H04N 19/65* (2014.01)

(52) U.S. Cl.
CPC ......... *H04N 19/186* (2014.11); *H04N 19/124* (2014.11); *H04N 19/176* (2014.11); *H04N 19/184* (2014.11); *H04N 19/65* (2014.11)

(58) Field of Classification Search
CPC .. H04N 19/186; H04N 19/124; H04N 19/176; H04N 19/184; H04N 19/65
See application file for complete search history.

(56) References Cited

U.S. PATENT DOCUMENTS 9,706,212 B2 7/2017 Yu et al.
2020/0177882 A1* 6/2020 Yoo .................. H04N 19/18
2022/0078455 A1* 3/2022 Yoo .................. H04N 19/157

OTHER PUBLICATIONS

Liu, Shan, et al. "Overview of HEVC Extensions on Screen Content Coding." APSIPA Transactions on Signal and Information Processing, vol. 4, 2015, p. e10., doi: 10.1017/ATSIP.2015.11. 12 pages.

(Continued)

*Primary Examiner* — Jae N Noh

(57) ABSTRACT

An encoder implements a residual-free palette encoding mode in which a block of pixels is used to derive a palette table having a number of palette colors less than a number of pixel colors in the block of pixels, and to derive a color map representing each pixel of the block with a corresponding index number associated with a palette color that most closely matches the pixel's color. The calculations of residuals representing errors between the predicted palette colors and the actual pixel colors are omitted during the encoding process, thereby facilitating implementation of less complex palette mode encoder hardware at the expense of slight loss of color accuracy. Moreover, when multiple encoding modes are available, the encoder can employ the residual-free palette encoding mode when the rate-distortion cost or other cost of using this mode is determined to be the lowest cost of the plurality of encoding modes.

20 Claims, 4 Drawing Sheets

(56) References Cited

OTHER PUBLICATIONS

Xu et al., "Overview of the Emerging HEVC Screen Content Coding Extension," IEEE Transactions on Circuits and Systems for Video Technology, 2015, 16 pages.

Ye, Dan. "Screen Content Coding (SCC) Offers Improved Quality and Efficiency for HEVC Screen-Captured Content," Streaming Media Magazine, May 27, 2016, <https://www.streamingmedia.com/Articles/ReadArticle.aspx?ArticleID=111356> Accessed Sep. 20, 2022, 3 pages.

* cited by examiner

RESIDUAL-FREE PALATTE MODE CODING

BACKGROUND

Due to desktop sharing, video conferencing, mobile media presentation, cloud computing, cloud gaming, and other similar network-based video screen sharing technologies, screen content is rapidly becoming an integral component of many video streams. Unlike camera-captured video content or certain computer-rendered video content, screen content typically is characterized by relatively low noise, relatively few colors, and relatively sharp edges. For example, black text on a white background may be represented primarily by pixels that are black, white, or a few shades of grey, and with sharp edges/transitions throughout. Certain video coding standards, such as the International Telecommunications Union (ITU) H.265 High Efficiency Video Coding (HEVC) standard, provide for various Screen Content Coding (SCC) modes that take advantage of the particular characteristics of screen content.

One such mode includes a palette mode in which a palette table is derived from the pixels of a coding unit (CU) of a frame being encoded. The palette table maps each of a set of index values to a set of palette colors (also known as "major colors") representing the most-frequently encountered colors in the CU. A color map is derived by mapping each pixel in the CU to a corresponding palette color in the palette table, and inserting the index number for the mapped palette color into the corresponding position in the color map. Any pixel values that do not sufficiently match with a palette color are designated as "escape" pixels. The palette table and the color map are then entropy encoded and the resulting encoded bits inserted into the bitstream representing the encoded video frame, along with associated metadata. The residual errors, or "residuals", of the color mapping process, including any escape pixels and differences between the predicted palette color and actual color of a pixel in the CU, then are subjected to quantization, a spatial transform, and an inverse spatial transform before also being encoded and the resulting encoded bits being inserted into the bit stream. On the decoder side, the palette table, color map, and residuals are decoded from the bit stream, and the residuals subjected to spatial quantization/inverse quantization to recover the original residuals (or lossy representations thereof), and then the CU is reconstructed from the recovered palette table, color map, and residuals.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
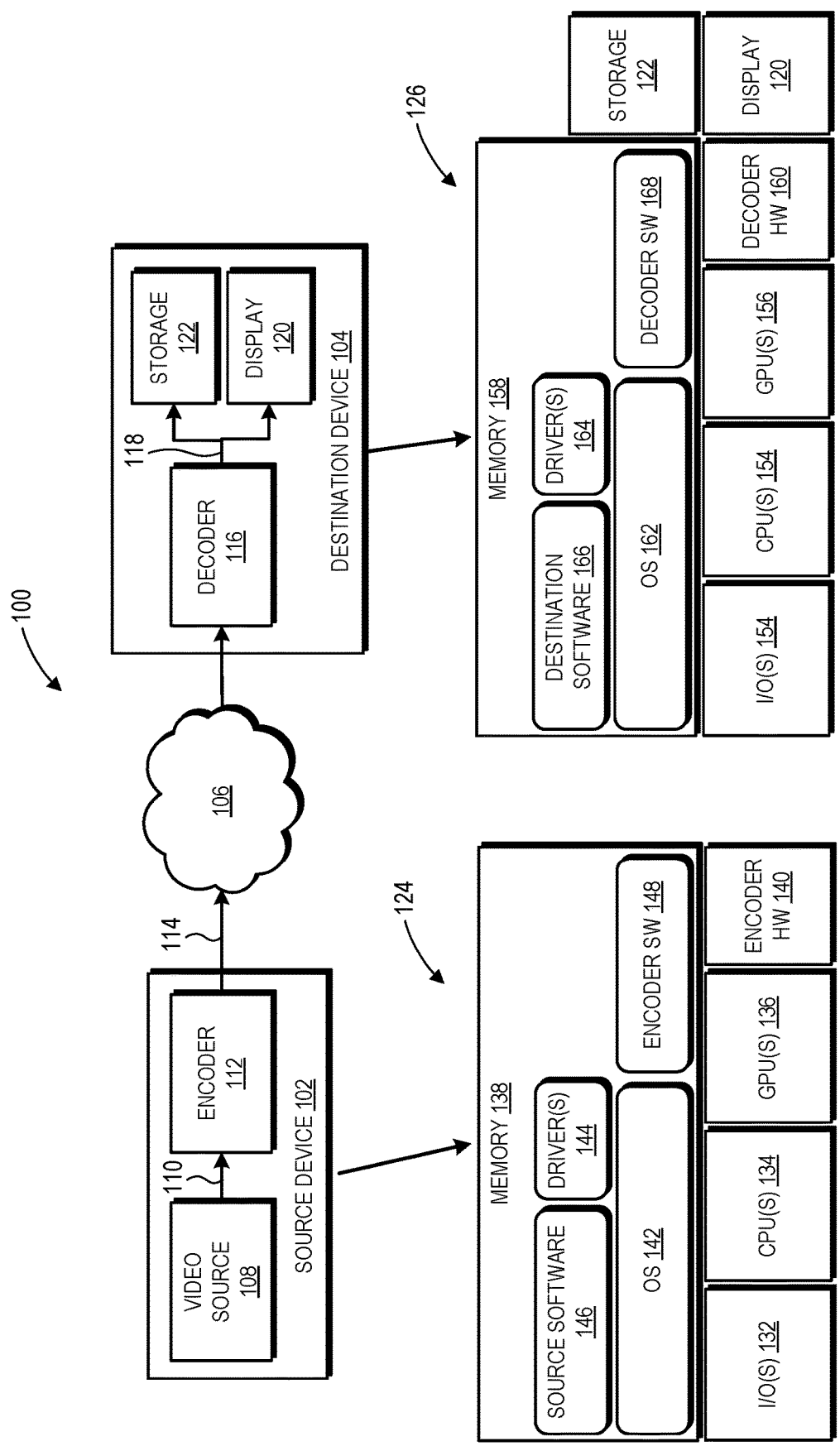
FIG. 1 is a block diagram of a video codec system employing residual-free palette mode coding in accordance with some implementations.

Palette mode coding often provides for efficient coding of screen content through the replacement of pixel values with shorter index numbers that reference corresponding palette colors of a palette table. Ideally, the size of the palette table is sufficient to represent every color present in a CU or other block of pixels being encoded. However, the cost of encoding and transmitting a palette table is proportional to the number of entries. Likewise, as the number of entries increases, the number of bits required to represent an entry in the color map increases, thereby increasing the coding and transmission costs of the color map as well. Accordingly, a palette mode coding process typically seeks to employ a relatively small number of palette colors, and thus a relatively small palette table and corresponding index value bit size. However, when there are more colors in a CU or other block being encoded than there are palette colors available, the coding process relies on identifying the closest matching palette color to a non-palette color in the CU, using the index for the closest matching palette color for the corresponding pixel position in the color map, and then noting the residual (or residual error)(that is, the difference between the actual pixel color and the indexed palette color) for later use. In some instances, a pixel color may be too different from any palette color, in which case the pixel color is designated as an "escape" color and separately stored. After the color map for the CU or other block is derived, the palette table and color map are subjected to relatively straightforward entropy encoding (e.g., run-length encoding). However, the residuals between actual pixel colors and their predicted palette colors as represented in the color map conventionally are subjected to the same or similar spatial transform and inverse transform processes that other types of encoding residuals typically are subjected to. This transform-based encoding of the residuals often requires additional complex hardware at the encoder, and thus increases the cost and complexity of the encoder.

To address these issues and other issues, FIGS. 1-5 below describe systems and methods for residual-free palette mode coding. In implementations, an encoder employs a residual-free palette mode encoding mode in which, for each CU (or other block) being encoded, the encoder derives a palette table of N palette colors from the pixel colors of the CU. The encoder then derives a color map using the pixels of the CU and the palette table, where each position in the color map corresponds to a pixel in the same position in the CU, and the value at that position in the color map corresponds to the pixel color of the pixel in the same position in the CU. In implementations, the number C of pixel colors typically is greater than the number N of palette colors (that is C>N). As a result, one or more pixel colors of the CU will not be an exact match to a palette color of the palette table. Conventionally, this would a prediction of the closest-matching palette color and determination of the residual (that is, the difference between the actual pixel color and the predicted palette color) for later processing for inclusion in the outgoing bitstream. However, rather than deriving and retain the residuals for subsequent inclusion on the outgoing bitstream for purposes of recovery of the non-palette pixel colors, in at least one embodiment the residual-free palette encoding mode avoids the process of determining the residuals and subsequently performing the typical spatial-transform-based processes used to encode the residuals. Under this process, non-palette pixel colors are mapped to the closest palette color in the palette table for purposes of populating the color map. Escape pixels, that is pixels having colors that are not sufficiently close to a palette color can be handled by either indexing them to the closest palette color (that is, forcing a match) without retaining any residual or by explicitly including the escape pixels as such in the palette table as conventionally done. The color map and the palette table then are entropy encoded, and the resulting bit stream is transmitted to a decoder. The decoder, in turn, can employ a conventional palette decoding mode in which the decoder decodes the bitstream to obtain the palette table and the color map, and from these derives a representation of the original CU. In the event that the original CU had non-palette colors, the recovered representation of the original CU (that is, the recovered block of pixels) will be a lossy representation as no residuals describing the difference between the predicted pixel colors and actual pixel colors were included by the encoder (that is, the encoded representation of the CU is residual-free). However, while there may be some video quality loss due to the lossy reconstruction afforded by omitting residuals, this residual-free palette mode coding process avoids the use of spatial transforms/inverse transforms, and thus requires considerably less hardware resources to employ. Thus, in instances where this residual-free palette mode coding process is deemed to be the most effective for encoding a block over other encoding options, a relatively small loss in video quality (in most cases) is traded for a relatively large reduction in hardware and network resources.

For ease of reference, various systems and techniques are described herein in an example context of the ITU H.265 HEVC video coding standard. However, it will be appreciated that these systems and techniques are not limited to this example context, and thus reference to certain HEVC-specific terms will be understood to equally apply to equivalent terms in other video coding standards. For example, reference to a CU as the bases for palette mode coding will be understood to equally apply to whatever block, or array, of J×K pixels (J, K>1) from a video frame used for derivation of a palette table or a color map in the corresponding video coding standard.

FIG. 1 illustrates a video coding system 100 employing residual-free palette mode coding in accordance with some implementations. The video coding system 100 includes a source device 102 connected to a destination device 104 via a connection 106. The source device 102 includes any of a variety of devices or systems used to encode a video stream, whether generated at the source device 102 or received at the source device 102 from another device in encoded or unencoded form. The destination device 104 includes any of a variety of devices or systems used to decode the video stream encoded by the source device 102, whether for consumption at the destination device 104 or for forwarding on to yet another device in encoded or decoded form. The connection 106 can include any of a variety of wired or wireless connections, or a combination thereof, such as a wired cable, a wireless network connection, a wired network connection, the Internet, and the like. For example, the source device 102 can include a server that operates to encode camera-captured video content, computer-rendered content, or a combination thereof, for transmission to the destination device 104 in the form of a smartphone, a compute-enabled vehicle entertainment system, a compute-enabled appliance, a tablet computer, a laptop computer, a desktop computer, a video game console, a television, and the like. As another example, each of the source device 102 and the destination device 104 can include a smartphone, a table computer, a laptop computer, a desktop computer, a video game console, a television, and the like. Moreover, it will be appreciated that the destination device 104 may operate as a source device and the source device 102 operate as a destination device for the encoding and decoding of a video stream transmitted in the other direction.

As a general operational overview, a video source 108 of the source device 102 operates to generate a sequence 110 of video frames. For example, the video source 108 can include a camera capturing video frames, a video game application, video conferencing application, remote desktop sharing application, or other computer application that generates a sequence of video frames, either from camera capture, computer rendering, or a combination thereof. An encoder 112 encodes the sequence 110 of video frames, along with associated audio data and metadata, generating an encoded bitstream 114 that is transmitted to the destination device 104 via the connection 106. At the destination device 104, a decoder 116 decodes the encoded bitstream 114 to generate a recovered sequence 118 of video frames, which then may be presented at a display 120, stored at a storage device 122, re-encoded for transmission to yet another device or for storage, and the like.

In implementations, the encoder 112 employs one or more encoding modes for encoding the video frames of the sequence 110, whereby the encoder 112 may switch between encoding modes on a frame-by-frame basis, or on a sub-frame-by-sub-frame basis. For example, each frame may be segmented into a plurality of tiles, slices, coding tree units (CTUs), coding units (CUs), or other blocks of J×K pixels, and the encoder 112 may select a suitable encoding mode for each such block based on an analysis of the contents or other characteristic of that block. In at least one embodiment, this set of encoding modes includes a residual-free palette encoding mode as described in greater detail below with reference to FIGS. 2 and 4 below. Likewise, the decoder 116 employs one or more complementary decoding modes for decoding the encoded video frames of the encoded bitstream 114 on the same frame or block-partition basis.

Views 124 and 126 illustrate example hardware configurations for the source device 102 and the destination device 104, respectively. As shown by view 124, the source device 102 includes one or more I/O devices 132, including an interface for interfacing with the connection 106 (e.g., a network interface for a network connection, a cable interface for a cable connection, etc.). The source device 102 further includes one or more central processing units (CPUs) 134, one or more graphics processing units (GPUs) 136, and one or more memories 138. The source device 102 further includes encoder hardware 140 for performing some or all of the encoding processes described herein. The encoder hardware 140 can include one or more of the CPUs 134, one or more of the GPUs 136, or a combination thereof. Alternatively, the encoder hardware 140 can include encoder-specific hardware, such as one or more application specific integrated circuits (ASICs), one or more programmable logic devices, and the like, or a combination thereof. The encoder hardware 140 instead can include a combination of one or more CPUs 134 and/or GPUs 136 as well as encoder-specific hardware, such as one or more ASICs and/or one or more programmable logic devices. Other well-known hardware components typically implemented at video codec device, such as speakers, microphones, power supplies, busses, power managers, etc., are omitted for clarity.

The one or more memories 138 include one or more types of memory, such as random access memory (RAM), read-only memory (ROM), Flash memory, hard disc drives, register files, and the like, and store one or more sets of executable instructions that, when executed by the one or more CPUs 134 and/or the one or more GPUs 136, manipulate the hardware of the source device 102 to perform the functionality ascribed to the source device 102 herein. In particular, the executable instructions can implement an operating system (OS) 142 for overall control and coordination of the hardware components of the source device 102, device drivers 144, such as a graphics drivers, for coordination and control of the one or more GPUs 136 by the one or more CPUs 134, and a video source application 146. The video source application 146 represents the video source 108 in that it coordinates with the OS 142 and device drivers 144 to control the one or more CPUs 134 and the one or more GPUs 136 to capture, render, or otherwise generate the sequence 110 of video frames. To illustrate, the video source application 146 can include a video conference application, a remote desktop application, a wireless display application, a cloud gaming application, a video streaming application, and the like. In some embodiments, the executable instructions further include encoder software 148 that executes to manipulate the encoder hardware 140 (which may include one or more CPUs 134 and/or one or more GPUs 136) to perform the encoding processes described herein. That is, the encoder 112 is implemented at least in part by one or more processors that execute software to perform at least some of the encoding processes described herein. As such, the encoder software 148 may be implemented in whole or in part as a device driver, such as a graphics driver, as part of the video source application 146, as part of the OS 142, or a combination thereof. In other embodiments, the encoder processes described herein are implemented entirely in application-specific hardware, such as one or more ASICs or one or more programmable logic devices.

As shown by view 126, the destination device 104 may have a similar hardware configuration. As such, the destination device 104 can include one or more I/O devices 152, including an interface for interfacing with the connection 106, one or more central processing units (CPUs) 154, one or more graphics processing units (GPUs) 156, and one or more memories 158. The destination device 104 further includes decoder hardware 160 for performing some or all of the encoding processes described herein. As with the encoder hardware 140, the decoder hardware 160 can include one or more of the CPUs 154, one or more of the GPUs 156, one or more ASICs, one or more programmable logic devices, or a combination thereof. Other well-known hardware components typically implemented at video codec device, such as speakers, microphones, power supplies, busses, power managers, etc., are omitted for clarity. Depending on implementation, the destination device 104 further may include one or more components for "consuming" the decoded sequence 118 of video frames, such as the display 120 or the storage device 122.

The one or more memories 158 include one or more types of memory and store one or more sets of executable instructions that, when executed by the one or more CPUs 154 and/or the one or more GPUs 156, manipulate the hardware of the destination device 104 to perform the functionality ascribed to the destination device 14 herein. In particular, the executable instructions can implement an OS 162 for overall control and coordination of the hardware components of the destination device 104, device drivers 164, such as a graphics driver, for coordination and control of the one or more GPUs 156 by the one or more CPUs 154, and a video destination application 166. The video destination application 166 represents the video destination in that it coordinates with the OS 162 and device drivers 164 to control the one or more CPUs 134 and the one or more GPUs 136 to consume the decoded sequence 118 of video frames, either by presentation at the display 120, storage at the storage device 122, re-encoding by an encoder (not shown), and the like. To illustrate, the video destination application 166 can include a video conference application, a remote desktop application, a wireless display application, a client gaming application, a video streaming application, and the like.

In some embodiments, the executable instructions further include decoder software 168 that executes to manipulate the decoder hardware 160 (which may include one or more CPUs 154 and/or one or more GPUs 156) to perform the decoding processes described herein. That is, the decoder 116 is implemented at least in part by one or more processors that execute software to perform at least some of the decoding processes described herein. As such, the decoder software 168 may be implemented in whole or in part as a device driver, such as a graphics driver, as part of the video destination application 166, as part of the OS 162, or a combination thereof. In other embodiments, the decoder processes described herein are implemented entirely in application-specific hardware, such as one or more ASICs or one or more programmable logic devices.

Figure 2:
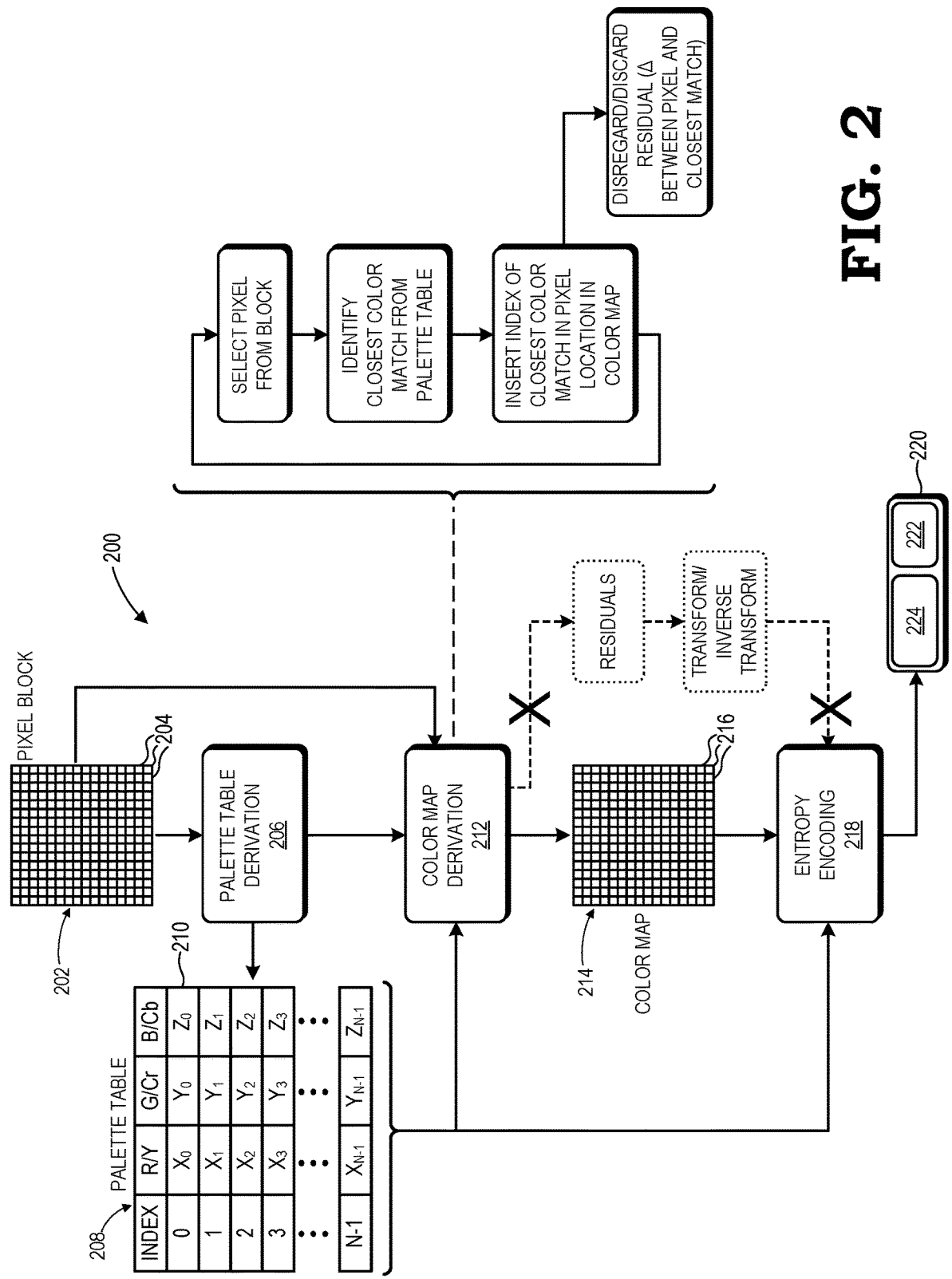
FIG. 2 is a flow diagram illustrating a method for residual-free palette mode encoding in accordance with some embodiments.

Referring now to FIG. 2, a method 200 for residual-free palette mode encoding employed by, for example, the encoder 112 is illustrated in accordance with at least one implementation. While the method 200 is described in the example context of the video codec system 100 of FIG. 1 and the corresponding hardware configurations of the source device 102, the method 200 may be performed in other implementations using the guidelines provided herein.

As with many video encoding processes, a video frame is partitioned into an array of pixel blocks, each pixel block comprising J×K pixels of the video frame, and each pixel block being separately encoded as a unit. This pixel block can include a tile, a slice, a CTU, a CU, a macroblock, or some other 2D segment of pixels of the video frame. Thus, an iteration of the method 300 initiates with the selection of a next pixel block 202 (or first block) of pixels 204 of a video frame (not shown) to be encoded by the encoder 112 in the residual-free palette encoding mode. For purposes of illustration, an example in which the pixel block 202 is a CU of the video frame is described herein, and thus the pixel block 202 is referred to hereinafter as CU 202.

With the CU 202 selected, at block 206 the encoder 112 derives, or generates, a palette table 208 from the pixel colors of the pixels 204 of the CU 202. As shown, the palette table 208 represents a table of N entries (e.g., entry 210), each entry indexed by a corresponding index number i={0, 1, 2 . . . N−1} and being associated with a corresponding palette color entry 210 storing a representation of a corresponding palette color (also known as a major color) selected from the pixel colors of the pixels 204. The representation for the ith palette color thus can include, for example, a three-value vector $<X_i, Y_i, Z_i>$, such as a red-blue-green (RGB) vector, a luminance-chrominance (YUV)(e.g., YCrCb) vector, or other similar pixel color representation, depending on the color space representation employed for the CU 202. Any of a variety of techniques can be employed to select the (up to) N palette colors to be represented in the palette table 208. For example, a histogram of the pixel colors of the J×K pixels 204 of the CU 202 can be generated, and the N most frequent pixel colors in the histogram are selected as the palette colors and used to populate the palette table 208. As another example, a clustering method can be employed on the histogram to identify N clusters, each cluster having one or more similar pixel colors, and for each cluster a representative pixel color is selected, such as by identifying the centroid or average pixel color of each cluster, and then populating the palette table 208 with the identified representative pixel color from each of the N clusters.

At block 212, the encoder 112 derives, or generates, a color map 214 using the CU 202 and the palette table 208. To do so, for each selected pixel 204 (block 213) of the CU 202, at block 215 the encoder 112 predicts the palette color from the palette table 208 that represents the actual pixel color of the pixel 204 and at block 217 places the index value i associated with the identified palette color in the entry 216 of the color map 214 that corresponds to the position of the pixel 204. That is, the color map 214 is a J×K array of entries 216 corresponding to the J×K array of pixels 204 of the CU 202, with an entry 216 at position (j, k) of the color map 214 storing the index value i of the palette color from the palette table 208 that was predicted for the actual pixel color of the pixel 204 at position (j, k) of the CU 202.

The number N of entries in the palette table 208, and thus the number N of palette colors may be dynamically set based on a quantization parameter (QP) in use of a time of encoding the CU 202, or set in a manner similar to setting the QP depending on various conditions, such as bit rate budget, predicted complexity, transmission bandwidth availability, encoding hardware resource availability, and the like. Thus, the number N of entries for the palette table 208 generated for one CU 202 may differ from the number N of entries available for the palette table 208 generated for the next CU 202 to be encoded, in response to changing conditions in the video codec system 100, such as the quantization parameter in use at the time of encoding of the CU 202.

In a conventional palette mode coding process, the available size N of the palette table is sufficient to represent all of the pixel colors present in the CU or other block being encoded, either as indexed palette colors, or as pixel colors that are not represented as palette colors, but instead are inserted into the palette table as "escape" pixels, which are provided in their actual or quantized form for entropy encoding. Thus, in such conventional approaches, palette mode encoding typically is only utilized for encoding a CU or other block when the available palette table is sufficiently large to represent every pixel color in the block as either a palette color or an escape pixel. If not, a conventional encoder selects a different encoding mode to employ for the block.

In contrast, the residual-free palette encoding mode described herein can, in certain circumstances, be efficiently employed to encode the CU 202 even when encoding conditions result in the implementation of palette table 208 with a number N of entries that is less than a number C of pixel colors for the pixels 204 of the CU 202 (that is, N<C, or even N<<C). In such circumstances, there will be instances in which an actual pixel color of a pixel in the CU 202 does not have an exact match to a palette color in the palette table 208. In this event, the prediction of a palette color to represent the actual color of a corresponding pixel requires prediction, or selection, of a palette color that best matches, but does not exactly match, the actual pixel color of the pixel 204. Any of a variety of techniques can be used to predict the best matching palette color. For example, for a given pixel, a minimum distance between the pixel color of the pixel and a corresponding palette color is calculated for each palette color, and the palette color that produces the lowest minimum distance is predicted as the best matching palette color.

The difference between the actual pixel color and its predicted palette color is known as the pixel's "residual error", or simply "residual", for encoding purposes. For example, if the actual palette color is <255, 56, 344> and the predicted palette color is <245, 50, 324>, then the residual for this pixel is <10, 6, 20>. In a conventional encoding process, the residuals from the color map derivation process of 214 would be calculated and then subjected to the same or similar processes employed for encoding residuals in other video encoding processes, which typically involves at least feed-forward spatial transform and feedback inverse spatial transform processes, such as a discrete cosign transform (DCT) and inverse discrete cosign transform (IDCT) or a discrete sign transform (DST) and inverse discrete sign transform (IDST). However, such spatial transform/inverse transform processes are computationally expensive and thus are often implemented directly in hardware, rather than via code executed by one or more processors.

Thus, in at least one embodiment, the residual-free palette encoding process of FIG. 2, rather than calculating and processing the residuals from the color map derivation process of block 212, the method 200 instead omits residual calculation and encoding (block 219), and instead derives the color map 214 in a lossy process such that, as described in greater detail below, the encoded bitstream 114 does not contain any residual content for the pixels represented in the color map 214, and thus only a lossy representation of the CU 202 can be recovered by the decoder 116, with each recovered pixel being limited to only one of the N palette colors. This omission of calculation of the residuals can include avoiding calculating the residuals entirely, or calculating the residuals and then discarding the residuals from the remainder of the encoding process. This residual-avoidance approach, however, permits the portion of the encoder hardware 140 to avoid the need to implement the hardware necessary to implement the spatial transform/inverse transform processes that otherwise would be needed to encode the residuals. To this end, as described below, FIGS. 4 and 5 describe a process in which various modes can be evaluated and the residual-free palette coding mode can be selected when the quality/efficiency tradeoff is suitable for the CU or other block being encoded.

After the color map 214 is derived without residuals, at block 218 the color map 214 and palette table 208 are subjected to an entropy encoding process that generates an encoded output 220 that includes an encoded representation 222 of the palette table 208 and an encoded representation 224 of the color map 214. This entropy encoding process can include any of a variety or combination of encoding processes, such as a run-length encoding process, a context-adaptive binary arithmetic coding (CABAC) process, and the like. The encoded output 220 then is inserted into the encoded bitstream 114 and transmitted to the destination device 104 via the connection 106.

Figure 3:
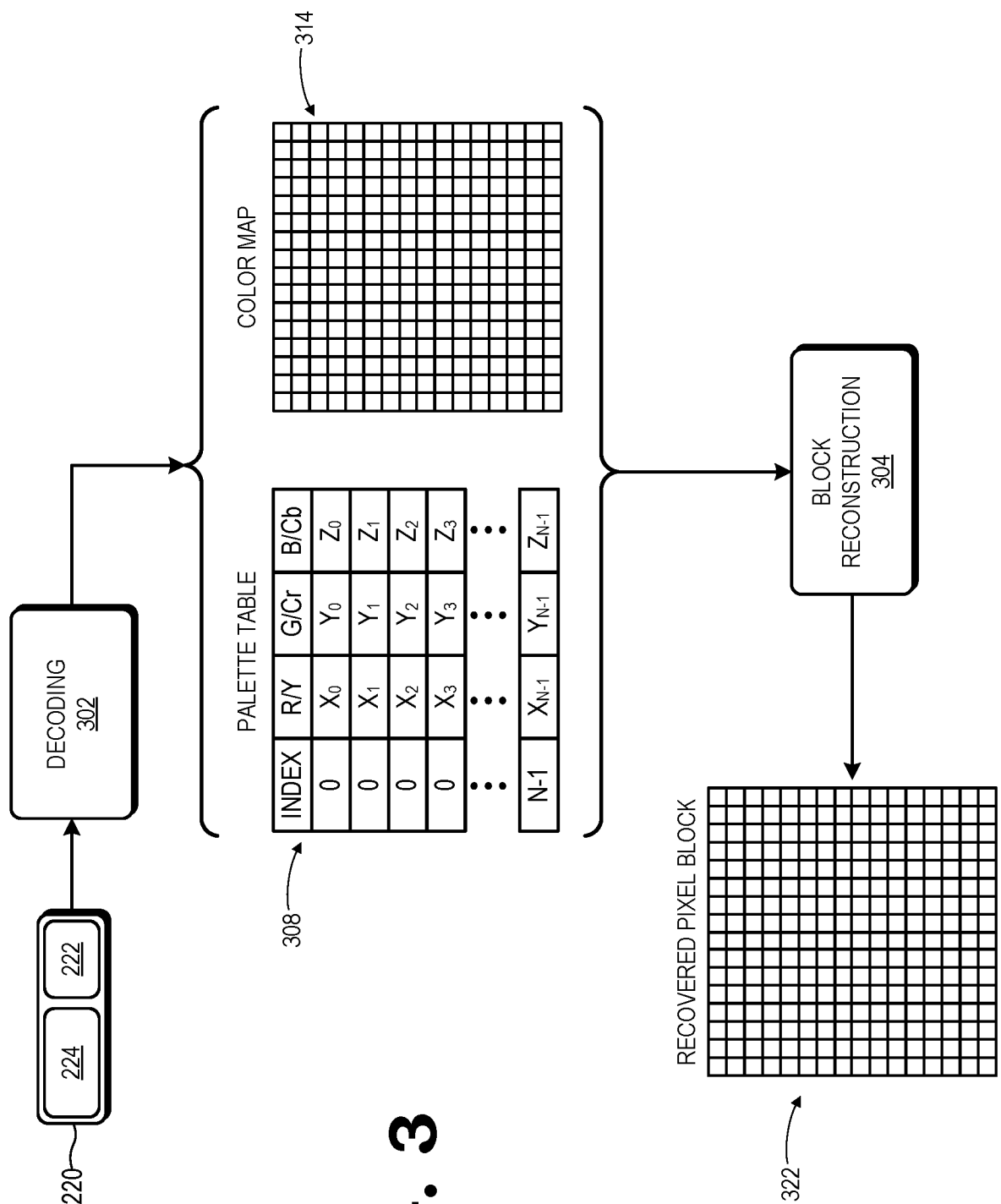
FIG. 3 is a flow diagram illustrating a method for residual-free palette mode decoding in accordance with some embodiments.

FIG. 3 illustrates a method 300 for palette mode decoding employed by, for example, the decoder 116 is illustrated in accordance with at least one implementation. While the method 300 is described in the example context of the video codec system 100 of FIG. 1 and the corresponding hardware configurations of the destination device 104, the method 300 may be performed in other implementations using the guidelines provided herein.

An iteration of method 300 begins with the extraction of the encoded output 220 (including an encoded representation 222 of the palette table 208 and an encoded representation 224 of the color map 214 for the CU 202, FIG. 2) from the received encoded bitstream 114 at the destination device 104. At block 302, the decoder 116 then performs a decoding process that is complementary to the entropy encoding process applied by the encoder 112 at block 218 of method 200. This decoding process results in recovery of a recovered palette table 308 and a recovered color map 314, which are lossy representations thereof.

At block 304, the decoder 116 then uses the recovered palette table 308 and the recovered color map 314 to derive a recovered CU 322 representative of the CU 202 encoded in FIG. 2 (or, more generally, to derive a recovered pixel block representative of the pixel block encoded in FIG. 2). This process includes recreating a pixel at position (j,k) in the recovered CU 322 with a pixel color corresponding to the palette color of the recovered palette table 308 indexed by the index value stored in the corresponding position (j,k) of the recovered color map 314. As such, the recovered CU 322 is a lossy recovery of the CU 322, with those pixels having non-palette pixel colors in the CU 322 instead being represented by the closest-matching palette color in the recovered CU 322. Thus, while there may be some loss in visual content accuracy, this is counterbalanced by the fact that the omission of residuals representing the errors between actual pixel colors and predicted palette colors for pixels of the CU 202/recovered CU 322 eliminated the need for the decoder 116 to employ hardware specifically to support the spatial transforms/inverse transforms that otherwise would have been needed to access and utilize such residuals to recover a more color-accurate recovered CU 322.

Figure 4:
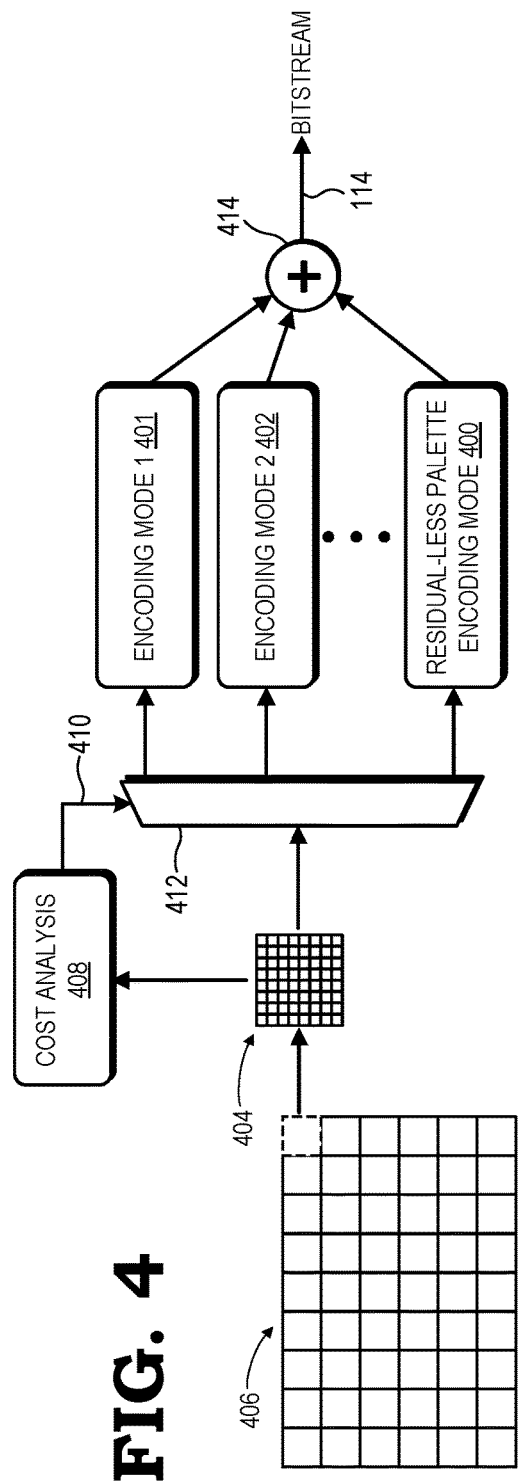
FIG. 4 is a diagram illustrating a cost-based encoding process having a residual-free palette mode option in accordance with some embodiments.

FIGS. 3 and 4 together illustrate a cost-based video coding process employed by the encoder 112 and the decoder 116 of the devices 102 and 104, respectively, in accordance with at least one embodiment. Referring to FIG. 4, a cost-based video encoding process employed by the encoder 112 includes a plurality of encoding modes available for implementation by the encoder on a pixel block-by-pixel block (e.g., CU-by-CU) basis. These plurality of encoding modes include a residual-free palette encoding mode 400 as described above with reference to method 200 of FIG. 2, as well as one or more other encoding modes 401, 402, etc., such as various intra-prediction encoding modes, inter-prediction encoding modes, and the like.

As will be appreciated, some encoding modes may be more or less suitable than other encoding modes depending on the circumstances of the CU or other pixel block to be encoded by the encoder 112. For example, the residual-free palette encoding mode 400 may efficiently and accurate encode certain screen content (e.g., text on a uniform background) but would be very inefficient and inaccurate for encoding camera-captured content with a wide range and number of colors, whereas a conventional HEVC Intra-encoding mode may be efficient and accurate for the camera-captured content but less efficient for the screen content. As such, when a CU 404 or other pixel block (e.g., CU 202) of a video frame 406 undergoing encoding by the encoder 112 is selected, at block 408 the encoder 112 performs a cost analysis on encoding the CU 404 using each of the plurality of encoding modes 400, 401, 402, and so forth, in order to select the encoding mode most suitable for use in encoding the CU 404. Any of a variety of cost analysis processes may be employed. For example, any of a variety of rate-distortion (RD) cost functions may be employed for each mode using the pixel data of the CU 404 to identify the encoding mode that offers the lowest rate-distortion cost when encoding the CU 404. When evaluating the residual-free palette encoding mode 400, this analysis would include analysis based on the size N of the palette table that would be generated (decided, e.g., based on a current QP in use at that time) and with the understanding that no residuals would be calculated, encoded, or transmitted. For example, this analysis can include calculation of the rate-distortion cost, where the rate cost refers to the bits estimation used to encode the color table and the color map and the distortion cost refers to the value difference between actual pixels and predicted pixels.

Thus, with the encoding cost for each of the plurality of encoding modes determined, the encoder 112 selects the encoding mode with the lowest encoding cost as the encoding mode to be employed for encoding the CU 404, and thus controls the portions of the encoder hardware 140 and encoder software 148 used to implement the selected encoding mode (symbolically represented by selection signal 410 and multiplexer 412) to encode the CU 404 according to the selected encoding mode. The resulting encoded output is then inserted into the encoded bitstream 114 (as symbolically represented by an adder 414 at the outputs of the plurality of encoding modes).

Figure 5:
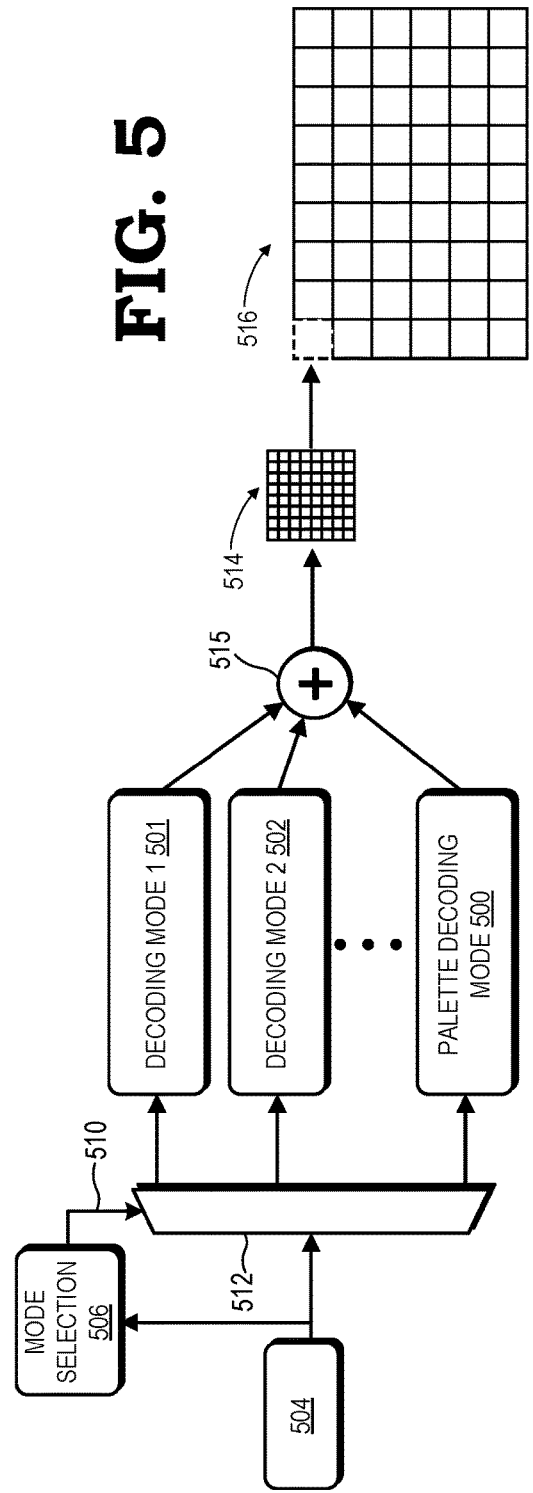
FIG. 5 is a diagram illustrating a decoding process having a residual-free palette mode option in accordance with some embodiments.

Referring to FIG. 5, a cost-based video decoding process employed by the decoder 116 complements the cost-based video encoding process employed by the encoder 112 and thus includes a plurality of decoding modes available for implementation by the decoder 116 on a pixel block-by-pixel block (e.g., CU-by-CU) basis. These plurality of decoding modes complement the encoding modes 400, 401, 402, etc. employed by the encoder 112 (FIG. 4), and thus include a residual-free palette decoding mode 500 as described above with reference to method 300 of FIG. 3, as well as one or more other decoding modes 501, 502, that complement the encoding modes 401, 402, etc., respectively.

The decoding process of FIG. 5 begins for a CU with the extraction of the encoded data 504 representative of a CU (e.g., CU 404, FIG. 4) or another pixel block from the encoded bitstream 114. In some embodiments, the encoded bitstream 114 includes a flag or other metadata that indicates the encoding mode employed for the CU or other pixel block represented by the encoded data 504. Accordingly, at block 506, the decoder 116 performs a mode extraction process to identify the encoding mode employed by the encoder 112 of FIG. 4 and thus identify the decoding mode to employ in decoding the encoded data 504. The decoder 116 then controls the portions of the decoder hardware 160 and decoder software 168 used to implement the selected decoding mode (symbolically represented by selection signal 510 and multiplexer 512) to decode the encoded data 504 according to the selected decoding mode to reconstruct a CU 514 or another pixel block representative of the CU 404 (FIG. 4) encoded by the encoder 112. The recovered CU 514 then is stored to a frame buffer or other storage (as represented symbolically by an adder 515) in which a corresponding video frame 516 (representative of the video frame 406, FIG. 4) is being recovered.

In some embodiments, certain aspects of the techniques described above may implemented by one or more processors of a processing system executing software stored in a non-transitory computer-readable medium. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method at a first device, comprising:
generating a palette table for a block of pixels of a video frame, the palette table implementing a number of palette colors less than a number of pixel colors in the block of pixels;
generating a color map using the palette table and the block of pixels, each position in the color map representing a position of a corresponding pixel in the block of pixels and storing an index value of a palette color of the palette table that is representative of a pixel color of the corresponding pixel, wherein generating the color map includes omitting calculation of a residual error between the pixel color of the corresponding pixel and the palette color selected for the corresponding pixel; and
encoding the palette table and the color map to generate encoded data for inclusion in a bit stream for transmission to a second device.

2. The method of claim 1, wherein omitting calculation of the residual error comprises bypassing calculation of the residual error.

3. The method of claim 1, wherein omitting calculation of the residual error comprises discarding a calculation of the residual error.

4. The method of claim 1, wherein the number of palette colors implemented in the palette table is based on a quantization parameter implemented at the first device at a time of encoding of the block of pixels.

5. The method of claim 1, wherein:
generating the palette table, generating the color map, and encoding the palette table and the color map are performed according to a palette encoding mode of the first device;
the first device implements a plurality of encoding modes including the palette encoding mode; and
the method further comprises:
determining an encoding cost for each of the plurality of encoding modes for the block of pixels; and
selecting the palette encoding mode for encoding the block of pixels responsive to determining that an encoding cost for the palette encoding mode is the lowest encoding cost for the plurality of encoding modes for the block of pixels.

6. The method of claim 5, wherein the encoding cost for an encoding mode for the block of pixels includes a rate-distortion cost for the encoding mode for the block of pixels.

7. The method of claim 5, further comprising:
receiving, at the second device, the encoded data, the second device implementing a plurality of decoding modes including a palette decoding mode; and
responsive to determining that the encoded data represents a pixel block encoded using the palette encoding mode, decoding the encoded data using the palette decoding mode to generate a recovered pixel block, wherein the recovered pixel block is a lossy representation of the pixel block.

8. The method of claim 1, further comprising:
decoding, at the second device, the encoded data to generate a recovered palette table and a recovered color map; and
generating a recovered block of pixels from the recovered palette table and the recovered color map, the recovered block of pixels being a lossy representation of the block of pixels.

9. A device, comprising:
a memory to store a video frame; and
an encoder coupled to the memory, the encoder to:
generate a palette table for a block of pixels of the video frame, the palette table implementing a number of palette colors less than a number of pixel colors in the block of pixels;
generate a color map using the palette table and the block of pixels, each position in the color map representing a position of a corresponding pixel in the block of pixels and storing an index value of a palette color of the palette table that is representative of a pixel color of the corresponding pixel, wherein generating the color map includes omitting calculation of a residual error between the pixel color of the corresponding pixel and the palette color selected for the corresponding pixel; and
encode the palette table and the color map to generate encoded data for inclusion in a bit stream for transmission to another device.

10. The device of claim 9, wherein the encoder omits calculation of the residual error by bypassing calculation of the residual error.

11. The device of claim 9, wherein the encoder omits calculation of the residual error by discarding a calculation of the residual error.

12. The device of claim 9, wherein the number of palette colors implemented in the palette table is based on a quantization parameter implemented at the encoder at a time of encoding of the block of pixels.

13. The device of claim 9, wherein:
the encoder is to generate the palette table, generate the color map, and encode the palette table and the color map according to a palette encoding mode of the encoder;
the encoder implements a plurality of encoding modes including the palette encoding mode; and
the encoder further is to:
determine an encoding cost for each of the plurality of encoding modes for the block of pixels; and
select the palette encoding mode for encoding the block of pixels responsive to determining that an encoding cost for the palette encoding mode is the lowest encoding cost for the plurality of encoding modes for the block of pixels.

14. The device of claim 13, wherein the encoding cost for an encoding mode for the block of pixels includes a rate-distortion cost for the encoding mode for the block of pixels.

15. A non-transitory computer-readable medium storing executable instructions that, when executed, manipulate at least one processor of a first device to:
generate a palette table for a block of pixels of a video frame, the palette table implementing a number of palette colors less than a number of pixel colors in the block of pixels;
generate a color map using the palette table and the block of pixels, each position in the color map representing a position of a corresponding pixel in the block of pixels and storing an index value of a palette color of the palette table that is representative of a pixel color of the corresponding pixel, wherein generating the color map includes omitting calculation of a residual error between the pixel color of the corresponding pixel and the palette color selected for the corresponding pixel; and
encode the palette table and the color map to generate encoded data for inclusion in a bit stream for transmission to a second device.

16. The non-transitory computer-readable medium of claim 15, wherein omitting calculation of the residual error comprises bypassing calculation of the residual error.

17. The non-transitory computer-readable medium of claim 15, wherein omitting calculation of the residual error comprises discarding a calculation of the residual error.

18. The non-transitory computer-readable medium of claim 15, wherein the number of palette colors implemented in the palette table is based on a quantization parameter implemented at a time of encoding of the block of pixels.

19. The non-transitory computer-readable medium of claim 15, wherein:
the executable instructions to manipulate at least one processor to generate the palette table, generate the color map, and encode the palette table and the color map are performed according to a palette encoding mode of the first device;
the first device implements a plurality of encoding modes including the palette encoding mode; and
the executable instructions further are to manipulate at least one processor to:
determine an encoding cost for each of the plurality of encoding modes for the block of pixels; and
select the palette encoding mode for encoding the block of pixels responsive to determining that an encoding cost for the palette encoding mode is the lowest encoding cost for the plurality of encoding modes for the block of pixels.

20. The non-transitory computer-readable medium of claim 19, wherein the encoding cost for an encoding mode for the block of pixels includes a rate-distortion cost for the encoding mode for the block of pixels.

* * * * *